(12) United States Patent
Marchini et al.

(10) Patent No.: US 11,366,851 B2
(45) Date of Patent: Jun. 21, 2022

(54) KARAOKE QUERY PROCESSING SYSTEM

(71) Applicant: Spotify AB, Stockholm (SE)

(72) Inventors: Marco Marchini, Paris (FR); Nicola Montecchio, Berlin (DE)

(73) Assignee: Spotify AB, Stockholm (SE)

( * ) Notice: Subject to any disclaimer, the term of this patent is extended or adjusted under 35 U.S.C. 154(b) by 257 days.

(21) Appl. No.: 16/719,779

(22) Filed: Dec. 18, 2019

(65) Prior Publication Data

US 2021/0191973 A1    Jun. 24, 2021

(51) Int. Cl.
| | | |
|---|---|---|
| *G06F 16/00* | (2019.01) | |
| *G06F 16/632* | (2019.01) | |
| *G06F 16/65* | (2019.01) | |
| *G06F 16/68* | (2019.01) | |
| *G06F 16/638* | (2019.01) | |

(52) U.S. Cl.
CPC .......... *G06F 16/634* (2019.01); *G06F 16/639* (2019.01); *G06F 16/65* (2019.01); *G06F 16/686* (2019.01)

(58) Field of Classification Search
CPC ...... G06F 16/634; G06F 16/65; G06F 16/686; G06F 16/639
See application file for complete search history.

(56) References Cited

U.S. PATENT DOCUMENTS

| | | |
|---|---|---|
| 6,710,822 B1 | 3/2004 | Walker et al. |
| 7,974,838 B1 | 7/2011 | Lukin et al. |
| 8,977,374 B1 | 3/2015 | Eck et al. |
| 9,325,641 B2 | 4/2016 | Haramaty et al. |
| 10,141,010 B1 * | 11/2018 | Nichols ............ H04N 21/45457 |
| 10,248,664 B1 | 4/2019 | Shen et al. |
| 10,257,072 B1 | 4/2019 | Salam |
| 10,685,634 B2 * | 6/2020 | Salazar .................. G10H 1/368 |
| 10,809,890 B1 * | 10/2020 | Krawczyk ............. G06F 3/0484 |

(Continued)

FOREIGN PATENT DOCUMENTS

| | | |
|---|---|---|
| CN | I07093419 A | 8/2017 |
| CN | 109272975 A | 1/2019 |

(Continued)

OTHER PUBLICATIONS

Emanuele Pollastri, "A Pitch Tracking System Dedicated to Process Singing Voice for Music Retrieval", IEEE, pp. 341-344 (Year: 2002).*

(Continued)

*Primary Examiner* — Jared M Bibbee
(74) *Attorney, Agent, or Firm* — Morgan, Lewis & Bockius LLP

(57) ABSTRACT

Computer systems and methods are provided for processing audio queries. An electronic device receives an audio clip and performs a matching process on the audio clip. The matching process includes comparing at least a portion of the audio clip to a plurality of reference audio tracks and identifying, based on the comparing, a first portion of a particular reference track that corresponds to the audio sample. Upon identifying the matching portion, the electronic device provides a backing track for playback which corresponds to the particular reference track, and an initial playback position of the backing track.

20 Claims, 6 Drawing Sheets

(56) References Cited

U.S. PATENT DOCUMENTS

| | | | |
|---|---|---|---|
| 2002/0099552 A1* | 7/2002 | Rubin | G09F 27/00 |
| | | | 704/270 |
| 2003/0233930 A1 | 12/2003 | Ozick | |
| 2004/0030691 A1* | 2/2004 | Woo | G06F 16/683 |
| 2005/0174923 A1* | 8/2005 | Bridges | G11B 27/034 |
| | | | 369/275.3 |
| 2007/0083365 A1 | 4/2007 | Shmunk | |
| 2007/0119292 A1 | 5/2007 | Nakamura | |
| 2007/0124293 A1* | 5/2007 | Lakowske | G06F 16/683 |
| 2008/0072741 A1* | 3/2008 | Ellis | G10H 1/0008 |
| | | | 84/609 |
| 2009/0317783 A1 | 12/2009 | Noguchi | |
| 2010/0169085 A1 | 7/2010 | Ranga Rao et al. | |
| 2014/0129235 A1 | 5/2014 | Suvanto | |
| 2016/0358594 A1 | 12/2016 | Hilderman et al. | |
| 2017/0292853 A1* | 10/2017 | Bostick | G10L 13/033 |
| 2018/0122403 A1 | 5/2018 | Koretzky et al. | |
| 2018/0182366 A1* | 6/2018 | Salazar | G06F 3/165 |
| 2018/0210952 A1* | 7/2018 | Takano | G06F 16/638 |
| 2019/0180142 A1 | 6/2019 | Lim et al. | |
| 2019/0208320 A1 | 7/2019 | Takahashi | |
| 2019/0213279 A1 | 7/2019 | Kim et al. | |
| 2020/0021873 A1 | 1/2020 | Swaminathan et al. | |

FOREIGN PATENT DOCUMENTS

| | | |
|---|---|---|
| WO | WO2018/047643 | 3/2018 |
| WO | WO2019/000054 A1 | 1/2019 |

OTHER PUBLICATIONS

Jansson, "Singing Voice Separation with Deep U-Net Convolutional Networks," Oct. 23-27, 2017, Proceedings of the 18th ISMIR Conference, Suzhou, China, 7 Pgs.

Singh, "Identifying the Genre of a Song with Neural Networks," Oct. 21, 2018, downloaded from https://medium.com/@navdeepsingh_2336/identifying-the-genre-of-a-song-with-neural-networks-851db89c42f0, 13 pgs.

Uhlich, Improving Music Source Separation Based on Deep Neural Networks Through Data Augmentation and Network Blending, ICASSP 2017, © 2017 IEEE, 5 pgs.

Yu, "A Query-by-Singing System for Retrieving Karaoke Music," IEEE Transactions on Multimedia, vol. 10, Issue 8, Dec. 12, 2008, 12 pgs.

Salamon, Melody, bass line, and harmony representations for music version identification, Proceeding of the 21st International World Wide Conference, Apr. 16, 2012, 8 pgs.

Spotify AB, Extended European Search Report, EP20191993.3, dated Feb. 12, 2021, 8 pgs.

Spotify AB, Extended European Search Report, EP20212961.5, dated May 6, 2021, 5 pgs.

Stoller, "Wave-U-Net: A Multi-Scale Neural Network for End-to-End Audio Source Separation," 19th International Society for Music Information Retrieval Conference, Paris, France, Jun. 8, 2018, 7 pgs.

Jansson, "Joint Singing Voice Separation and F0 Estimation with Deep U-Net Architectures," Nov. 18, 2019, https://ieeexplore.ieee.org/document/4694852, 5 pgs.

Bretan et al., "Learning Semantic Similarity in Music via Self-Supervision," Proceedings of the 20th ISMIR Conference, Delft, Netherlands, Nov. 4-8, 2019, 8 pgs.

Chen et al., "Playing Technique, Classification Based on Deep Collaborative Learning of Variational Auto-Encoder and Gaussian Process," ©2018 IEEE, downloaded on Sep. 11, 2021 from IEEE Xplore, 6 pgs.

Jansson, Office Action, U.S. Appl. No. 16/596,554, dated Oct. 25, 2021, 7 pgs.

Kumar, Office Action, U.S. Appl. No. 6/880,908, dated Jun. 7, 2021, 43 pgs.

Kumar, Office Action, U.S. Appl. No. 6/880,908, dated Sep. 21, 2021, 7 pgs.

Kumar, Final Office Action, U.S. Appl. No. 6/880,908, dated Oct. 4, 2021, 6 pgs.

Luo, et al., "Learning Domain-Adaptive Latent Representations of Music Signals Using Variational Autoencoders," Proceedings of the 19th ISMIR Conference, Paris, France, Sep. 23-27, 2018, 8 pgs.

Roche et al., "Autoencoders for music sound modeling: a comparison of linear, shallow, deep, recurrent and variational models," © 2019 Roche et al., arXiv:1806.04096v2 [eess.AS] May 24, 2019, 8 pgs.

* cited by examiner

Annotation Process 500

KARAOKE QUERY PROCESSING SYSTEM

RELATED APPLICATIONS

This application is related to U.S. patent application Ser. No. 16/596,554, filed Oct. 8, 2019, entitled "Systems and Methods for Jointly Estimating Sound Sources and Frequencies from Audio," which is hereby incorporated by reference in its entirety.

TECHNICAL FIELD

This application relates generally to audio query processing, and more particularly, to processing karaoke queries including audio recordings of vocal melodies in order to determine desired songs corresponding to the melodies with low processing latency.

BACKGROUND

Karaoke is a type of interactive entertainment in which an amateur singer sings along with recorded music using a microphone. The music is normally an instrumental version of a well-known popular song, or any song selected by the user as long as it is available in a karaoke library. Lyrics are usually displayed on a video screen, along with a moving symbol, changing color, or music video images, to guide the singer.

Karaoke can be performed in public locations with the help of a host or disk jockey (DJ). The host or DJ finds the singer's requested song and plays the instrumental track, allowing the singer or singers to perform along with the song. Karaoke can also be performed without a host or DJ. Instead, a singer can use a dedicated karaoke device, or any other electronic device configured to support karaoke, to select a song and sing along with the song's instrumental version while reading the lyrics on a display associated with the device.

Libraries of karaoke tracks may include tens of thousands of songs or more. As such, the search for a desired song can be overwhelming at times. If it takes too long to find a song, a singer may give up and decide not to perform, or audience members may lose interest in remaining in proximity to the karaoke performances while the singer searches for the song. In other scenarios, a singer may know only the melody of a desired song and cannot recall the song's name, artist, or other attributes required to select the song for a karaoke performance. In such scenarios, conventional karaoke devices would not be capable of determining the identity of the desired song, and the singer may decide to not perform.

SUMMARY

There is a need for a karaoke system which is capable of determining a user's desired song for a karaoke performance even if the user cannot remember the name of the song or any other attributes of the song except for the melody (or a portion of the melody) of the song. Since singers may not like singing a cappella (without accompaniment), and since singers and audience members may not have the patience to wait too long for the karaoke performance to begin, the karaoke system must determine the user's desired song with minimal processing latency.

In some embodiments, a user starts singing a song a cappella in the presence of a karaoke system as described herein. The karaoke system determines what the user is singing and begins playing an instrumental version of the determined song. In some embodiments, the karaoke system plays the instrumental version using the key in which the user is singing, the tempo at which the user is singing, and/or a location in the song proximate to a present location at which the user is singing.

To minimize processing latency while determining the desired song, some embodiments of the karaoke system preconfigure a song library with a plurality of transposed versions of each song. That way, when the karaoke system begins processing a query, the user's recorded voice does not need to be transposed. To further minimize processing latency during song matching, some embodiments of the karaoke system preconfigure the song library with annotated songs, where at least a verse or a chorus is annotated for each song. That way, the karaoke system may perform matching using only a subset of each song, thereby simplifying the matching process.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

In accordance with common practice, some of the drawings may not depict all of the components of a given system, method, or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, some processes, components, and materials have not been described in exhaustive detail so as not to unnecessarily obscure pertinent aspects of the embodiments described herein.

The systems and methods described herein pertain to processing karaoke song queries and supporting karaoke performances. These systems and methods improve on prior techniques for processing karaoke queries by returning results with decreased processing latency—a necessity for real time performance environments. These systems and methods improve on prior techniques for supporting karaoke performances by automatically matching backing tracks to the user's singing, allowing the user to perform a song without having to think about the key, tempo, or starting point—a convenience for performance environments in which the users are often amateur singers who may not be well versed in those aspects of musical theory.

Figure 1:
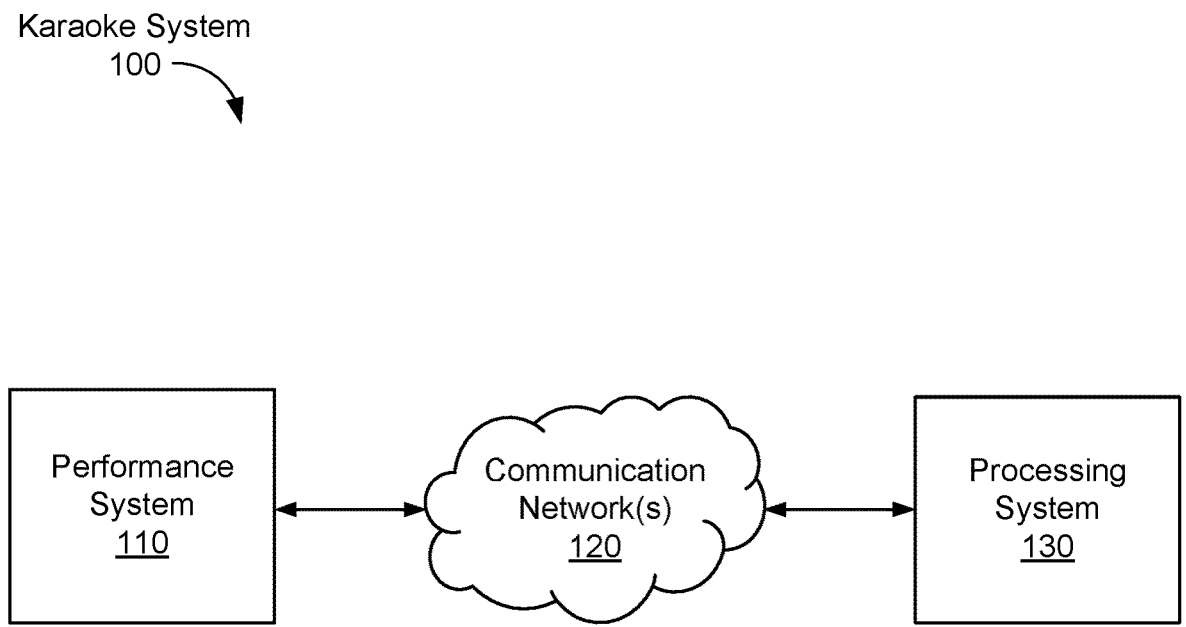
FIG. 1 is a system diagram of a karaoke system in accordance with some embodiments.

FIG. 1 is a system diagram of a karaoke system 100 in accordance with some embodiments. Typically, the karaoke system 100 includes a performance system 110 for supporting the karaoke performance in real time, and a processing system 130 for performing processing-intensive tasks required to support the performance system 110. In some embodiments, the performance system 110 and processing system 130 are separate components of the karaoke system 100, connected by one or more communication networks 120. In some embodiments, some or all of the components of system 130 may be implemented in system 110, and vice versa, obviating the need for a communication network 120.

The performance system 110 is typically an electronic device, including one or more of a karaoke machine, computer, smart phone, smart speaker, mobile device, and so forth. The performance system 110 includes components necessary for the performance aspect of karaoke, including a microphone, speaker, display, and user interface. The performance system 110 is the component of the karaoke system 100 which is disposed proximate to the user, in order to support user interaction (e.g., song selection) and the performance itself. The various components of the performance system 110 are discussed in more detail below with reference to FIG. 2.

The processing system 130 is typically a computing device, including, for example, one or more servers in a cloud-connected electronic server system. The processing system 130 includes components necessary for supporting the processing-intensive requirements of the performance system 110, such as song query handling, library processing, vocal and backing track pre-processing, and data storage. Results of the processing tasks handled by the processing system 130 may be used for a plurality of performance systems 110. The processing system 130 is the component of the karaoke system 100 which is not required to be disposed proximate to the user. Instead, the processing system 130 may be remotely disposed from the user (such as in a data center), and in communication with the performance system 110 via the communication network(s) 120. The various components of the processing system 130 are discussed in more detail below with reference to FIG. 3.

The communication network(s) 120 optionally communicate via wired and/or wireless communication connections. Communication networks optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, and/or any other suitable communication protocol, including communication protocols not yet developed as of the filing date of this document.

While FIG. 1 portrays systems 110 and 130 as separate components on each side of a communication network 120, this portrayal is for illustrative purposes and is not meant to be limiting. For instance, in some embodiments, some or all of the features of system 110 are implemented in system 130, and/or some or all of the features of system 130 are implemented in system 110. For implementations in which all of the features are implemented in one system (e.g., performance system 110), a communication network 120 may not be required.

Figure 2:
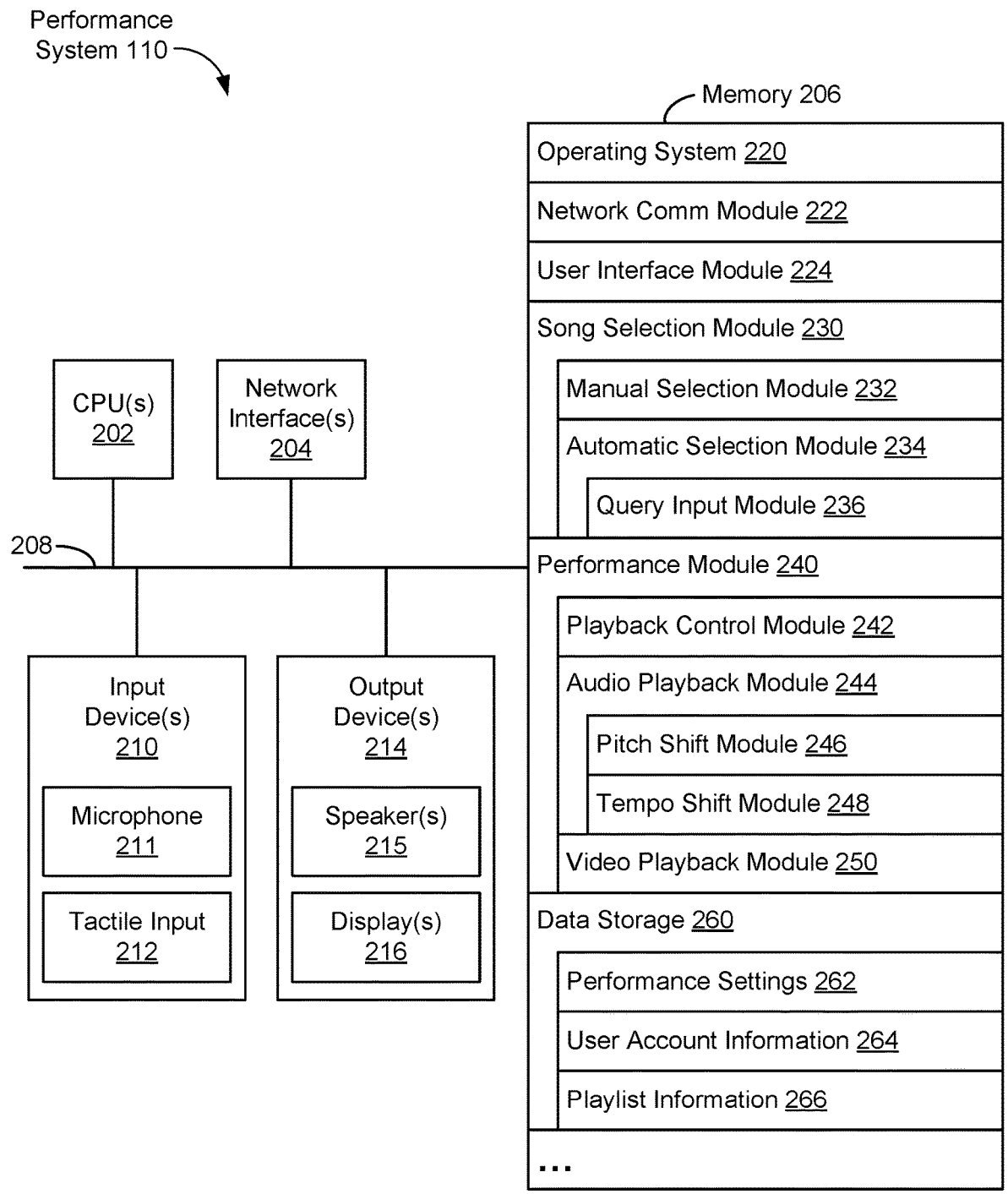
FIG. 2 is a block diagram of an example performance system of a karaoke system in accordance with some embodiments.

FIG. 2 is a block diagram of an example performance system 110 of the karaoke system 100 in accordance with some embodiments. The performance system 110 includes one or more processing units (CPUs) 202, one or more network interfaces 204, memory 206, and one or more communication buses 208 for interconnecting these components (sometimes called a chipset). In some embodiments, the performance system 110 includes one or more input devices 210 that facilitate user input, such as a keyboard, a mouse, a voice-command input unit or microphone 211, a touch screen display, a touch-sensitive input pad, a gesture capturing camera, or other input buttons or controls. Input devices requiring contact (e.g., keyboard and buttons) are referred to as tactile input 212. The microphone 211 may be configured to record a user's voice during a karaoke song query and/or during a karaoke performance. In some embodiments, the performance system 110 includes one or more output devices 214 that enable presentation of user interfaces and display content, including one or more speakers 215 (e.g., for playing back tracks, user vocal tracks, and so forth) and/or one or more visual displays 216 (e.g., for displaying lyrics or other user guides during a performance).

Memory 206 may include high-speed random access memory, such as DRAM, SRAM, DDR RAM, or other random access solid state memory devices, and optionally may include non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 220 including procedures for handling various basic system services and for performing hardware dependent tasks;

Network communication module 222 for connecting the performance system 110 to other devices (e.g., the processing system 130) via one or more network interfaces 204 (wired or wireless) and one or more networks 120, such as the Internet, other wide area networks, local area networks, metropolitan area networks, and so on;

User interface module 224 for enabling presentation of information (e.g., a graphical user interface for presenting applications, widgets, websites and web pages thereof, and/or games, audio and/or video content, text, etc.) at the performance system 110 via one or more output devices 214 (e.g., displays, speakers, etc.);

Song selection module 230 for obtaining a song selection from a user, for example, by prompting the user (through the user interface module 224) to select a desired song from a library of available songs for a karaoke performance, including:
  Manual selection module 232 for obtaining a desired song from a user by, for example, receiving a user input (e.g., tactile input 212 via the user interface module 224) corresponding with a song selection;
  Automatic selection module 234 for obtaining one or more audio recordings of a user singing at least a portion of a song without instrumental accompaniment, providing the audio recording(s) to the processing system 130, and receiving a song selection from the processing system 130 based on a match between the audio recording(s) and a reference signal corresponding with the song, including:
    Query input module 236 for managing the recording of the audio clips using predetermined recording lengths;
Performance module 240 for playing a backing track (through speaker(s) 215) corresponding to a selected song and, optionally, displaying lyrics or other visual signals (through display(s) 216) during karaoke performances, including:
  Playback control module 242 for controlling playback of the backing track during a karaoke performance based on user interactions with playback controls provided through the user interface module 224 (e.g., play, pause, audio mix);
  Audio playback module 244 for controlling audio components of the backing track during a karaoke performance, including:
    Pitch shift module 246 for transposing a backing track to match a key in which the user is singing;
    Tempo shift module 248 for setting the tempo of the backing track to match the tempo at which the user is singing;
  Video playback module 250 for controlling video components of the karaoke performance such as display of lyrics, music video clips, or other visual guides and/or indicators visible to the user during the performance;
Data storage 260 for storing data associated with the performance system 110 and/or the user, including:
  Performance settings 262 such as volume levels, audio mix levels (e.g., relative volumes of backing tracks and user vocals during a performance), video settings (e.g., lyric display settings such as size, color, and/or animation style), and/or adjustable presets for the aforementioned levels;
  User account information 264 such as account type, level of access (e.g., how many and/or which songs a user may have access to), and so forth; and/or
  Playlist information 266 including the songs to be made available for a given karaoke session (e.g., based on a user's level of access to various song libraries, or based on one or more user-customized playlists).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
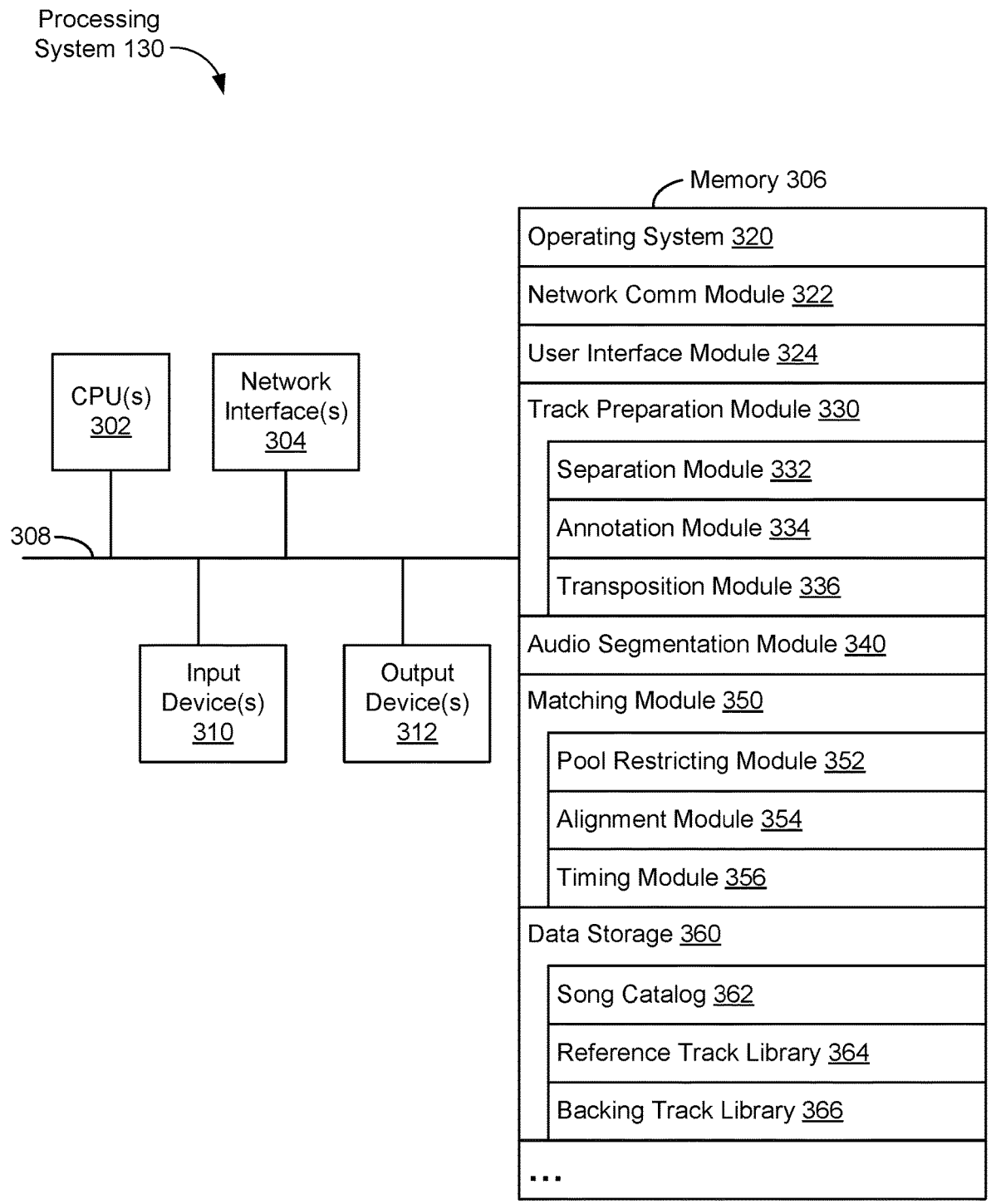
FIG. 3 is a block diagram of an example processing system for a karaoke system in accordance with some embodiments.

FIG. 3 is an example block diagram of an example processing system 130 for the karaoke system 100 in accordance with some embodiments. The processing system 130 includes one or more processing units (CPUs) 302, one or more network interfaces 304, memory 306, and one or more communication buses 308 for interconnecting these components (sometimes called a chipset). In some embodiments, the processing system 130 includes one or more input devices 310 that facilitate user input, such as a keyboard, a mouse, a voice-command input unit or microphone, a touch screen display, a touch-sensitive input pad, a gesture capturing camera, or other input buttons or controls. In some embodiments, the processing system 130 includes one or more output devices 312 that enable presentation of user interfaces and display content, including one or more speakers and/or one or more visual displays.

Memory 306 may include high-speed random access memory, such as DRAM, SRAM, DDR RAM, or other random access solid state memory devices, and optionally may include non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:
  Operating system 320 including procedures for handling various basic system services and for performing hardware dependent tasks;
  Network communication module 322 for connecting the processing system 130 to other devices (e.g., the performance system 110) via one or more network interfaces 304 (wired or wireless) and one or more networks 120, such as the Internet, other wide area networks, local area networks, metropolitan area networks, and so on;
  User interface module 324 for enabling presentation of information (e.g., a graphical user interface for presenting applications, widgets, websites and web pages thereof, and/or games, audio and/or video content, text, etc.) at the processing system 130 via one or more output devices 312 (e.g., displays, speakers, etc.);
  Track preparation module 330 for creating reference tracks for use by the matching module 350 (explained in more detail below), including:
    Separation module 332 for extracting vocal components from songs and creating (i) backing tracks consisting of instrumental-only versions of the songs and (ii) reference tracks consisting of the extracted vocal components;
    Annotation module 334 for inserting verse and/or chorus annotations into songs;
    Transposition module 336 for transposing the reference tracks into a plurality of pitches representing subdivisions of an octave;
  Audio segmentation module 340 for processing and storing audio recording clips received from the query input module 236 (FIG. 2) through, e.g., a communication network 120 via the network interface 304;

Matching module 350 for matching the stored audio recording clips (created by the audio segmentation module 340) to the reference clips (created by the track preparation module 330), including:
  Pool restricting module 352 for determining a subset of the reference clips for matching in order to reduce the amount of processing time required to perform the matching;
  Alignment module 354 for aligning the audio recording clips with the subset of reference clips in order to determine the closest match;
  Timing module 356 for determining a start location of a backing track based on the location of the reference track at which a match is found;
Data storage 360 for storing data associated with the processing system 130, including:
  Song catalog 362 including the songs available to the processing system 130 for processing (using the track preparation module 330);
  Reference track library 364 including the reference tracks produced by the track preparation module 330; and/or
  Backing track library 366 including the back tracks produced by the track preparation module 330.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 4:
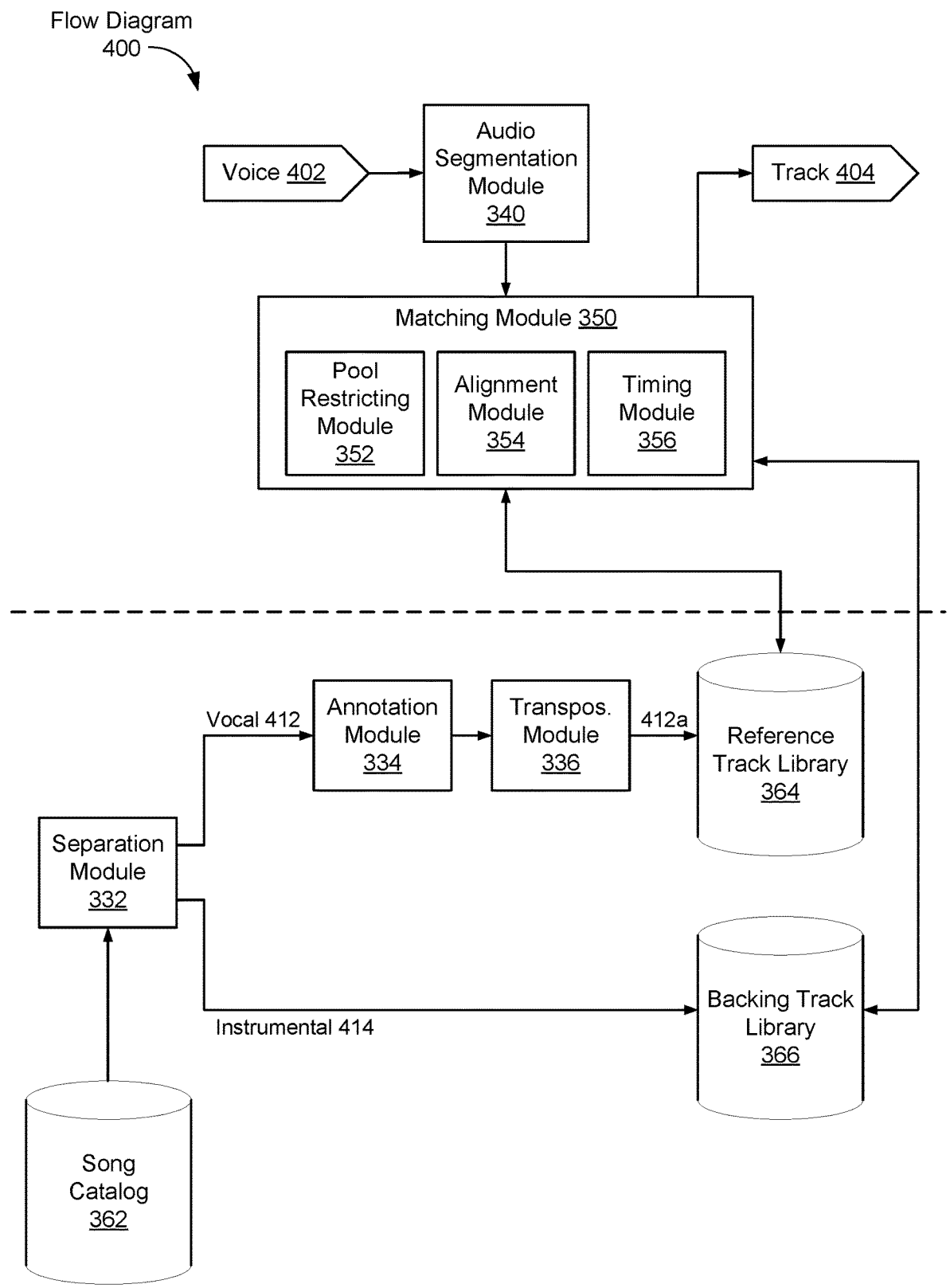
FIG. 4 is a control and data flow diagram of an example processing system for a karaoke system in accordance with some embodiments.

FIG. 4 is an example control and data flow diagram 400 of the processing system 130 for the karaoke system 100 in accordance with some embodiments. Features shared with FIG. 3 are similarly numbered. The modules below the dotted line represent processing operations which may occur before a user submits a query for determining a desired song for a karaoke performance. The modules above the dotted line represent processing operations which occur as a result of a received user query for determining a desired song for a karaoke performance. Since the operations below the dotted line may be performed before the processing system 130 receives any queries (e.g., the reference track library 364 and backing track library 366 are already populated), the processing system 130 may process a query with lower latency.

An example track preparation process (also referred to herein as pre-processing) will now be described with reference to the operations below the dotted line in FIG. 4.

The song catalog 362 stores a plurality of songs that are available to the karaoke system 100. In some implementations, the song catalog 362 may include dozens, hundreds, thousands, or millions of songs. The songs stored in the song catalog 362 may also be referred to as tracks, and these songs may represent the entirety of songs available to a media content provider under various licenses to which the media content provider is a party.

The processing system 130 selects one or more of the songs stored in the song catalog 362 for processing into reference (vocals only) tracks and backing (instrumental only) tracks. Throughout this disclosure, the process of separating songs into reference tracks and backing tracks is referred to as pre-processing, since these operations may be completed prior to the processing system 130 receiving a song query. In some embodiments, the selection process is automated (e.g., popular songs, newly published or acquired songs, and so forth). Additionally or alternatively, the selected songs are manually curated.

The separation module 332 splits each of the songs selected for pre-processing into a vocal track 412 and an instrumental track 414. In some embodiments, the splitting process includes extracting or isolating the frequencies representing vocal components of a song, creating a vocal track 412 using the extracted or isolated vocal frequencies, and creating an instrumental track 414 using the frequencies which were not extracted or isolated (the frequencies representing instrumental components of the song). In some embodiments, the splitting process includes a process for extracting pitch from the isolated vocal audio track. In these embodiments, the vocal track 412 includes only the extracted pitch components, thereby increasing performance of comparisons during matching (as described herein with reference to the matching module 350). In some embodiments, the splitting process uses any of the vocal separation operations described in U.S. patent application Ser. No. 16/596,554, which is incorporated by reference in its entirety. In some embodiments, the splitting process uses any of the vocal separation operations described in Jansson et al., "Joint Singing Voice Separation and F0 Estimation with Deep U-Net Architectures," which is incorporated by reference in its entirety.

The instrumental tracks 414 are stored in a backing track library 366 for later use in karaoke performances. For example, when the processing system 130 receives a song query and matches the query with a particular song, the processing system 130 provides the backing track for that song to the performance system 110 for the karaoke performance.

The vocal tracks 412 are stored in a reference track library 364 for later use in song query matching. For example, when the processing system 130 receives a song query, the matching module 350 matches the query with a particular song by using the reference tracks in the reference track library 364 (described in more detail below with reference to matching module 350).

In some embodiments, an annotation module 334 annotates the vocal tracks 412 before they are stored in the reference track library 364. The annotations provide a fixed number of starting points for the matching process (described in more detail below with reference to alignment module 354). Specifically, rather than using an entire reference track in the matching process, the alignment module 354 may use only a single verse and a single chorus during the matching process. By taking advantage of the assumptions that (a) singers who are attempting to recall a song are most likely to sing the melody from a verse or a chorus, and (b) in a given song, verses are typically similar in their melody lines and choruses are typically similar in their melody lines, the matching process will require less time for processing if the process only uses a single verse and a single chorus.

Figure 5:
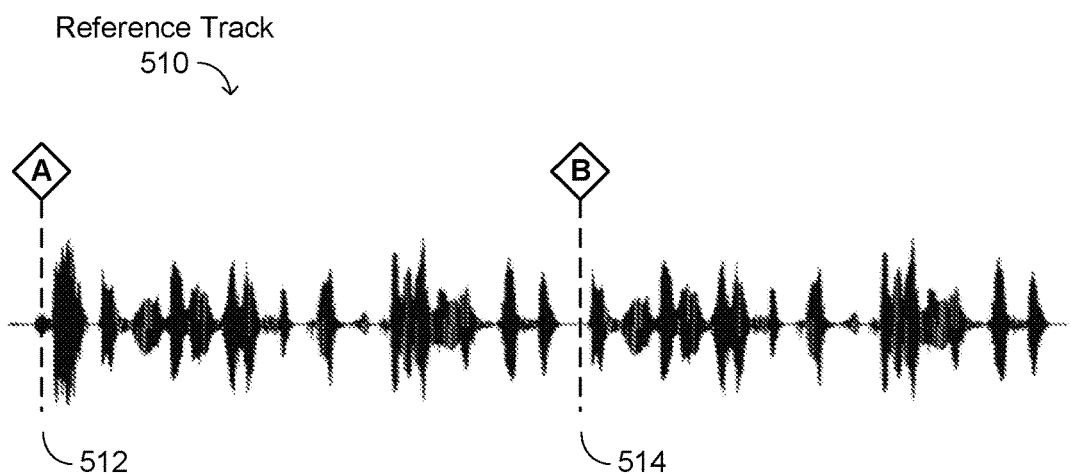
FIG. 5 illustrates an example annotation process in accordance with some embodiments.

FIG. 5 illustrates an example annotation process 500 in accordance with some embodiments. A reference track 510 includes a first annotation 512 (denoted "A") indicating a verse, and a second annotation 514 (denoted "B") indicating a chorus. Verse A can be assumed to have a similar melody line to other verses in the reference track 510, and chorus B can be assumed to have a similar melody line to other choruses in the reference track 510. Therefore, a matching process performed beginning at annotation A and annotation B can be assumed to be almost as comprehensive, if not just as comprehensive, as a matching process performed on the entire reference track 510. However, the simplified matching process performed only at annotations A and B requires considerably less processing time to complete; therefore, processing latency is decreased and a song query result may be determined more quickly. In some embodiments, more than one verse, more than one chorus, just one or more verses, just one or more choruses, a bridge, an intro, and/or an outro may also be annotated. However, since each annotation represents a starting point for a matching process, adding more annotations increases the number of comparisons that must be performed and therefore increases processing latency.

Returning to FIG. 4, in some embodiments, a transposition module 336 duplicates and transposes the vocal tracks 412 before they are stored in the reference track library 364. The transposed vocal tracks provide for more efficient song query matching (described in more detail below with reference to alignment module 354). Specifically, rather than analyze a singer's pitch, determine what key the singer is singing in, and transposing recorded clips of the singer for song query matching (all processing intensive processes), the reference track library 364 already includes transposed versions of each song (transposed and stored in advance of receiving any song queries). As such, the matching process only needs to perform comparisons with tracks which are already stored in the reference track library 364. Since the matching process does not require real time pitch determinations and key transpositions while the singer is submitting a song query (singing the melody of a song), the matching process may determine the desired song with decreased processing latency.

Figure 6:
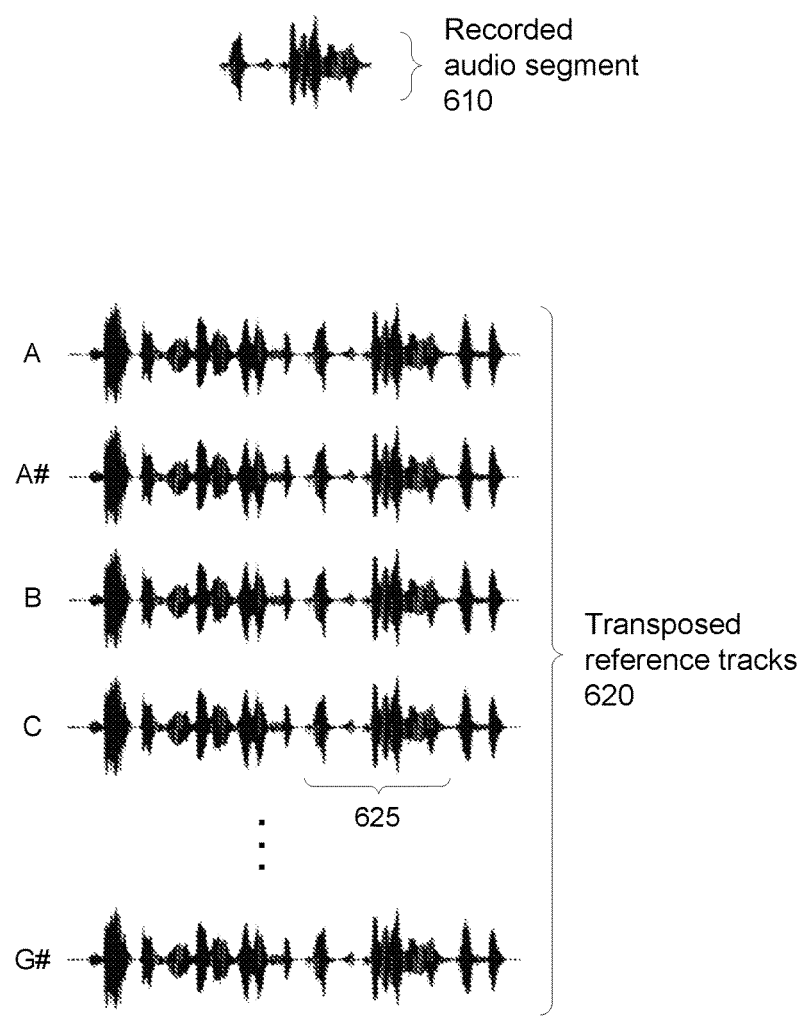
FIG. 6 illustrates an example transposition process in accordance with some embodiments.

FIG. 6 illustrates an example transposition process 600 in accordance with some embodiments. The transposition module 336 duplicates a reference track and transposes the duplicated reference tracks into a plurality of transposed reference tracks 620. Each track 620 is transposed to a different key. In some embodiments, the transposition module 336 transposes each reference track 620 into one of 12 subdivisions of the octave (A, A #/Bb, B, C, C #/Db, D, D #/Eb, E, F, F #/Gb, G, G #/Ab). In some embodiments, the transposition module 336 transposes each reference track 620 into one of 24 subdivisions of the octave (the 12 aforementioned subdivisions plus 12 subdivisions disposed between them, adding up to a precision of 24 half-tones). Less than 12 subdivisions, other numbers of subdivisions between 12 and 24, and/or more than 24 subdivisions may alternatively be implemented. However, the smaller the number of transposed tracks, the lower the matching accuracy, and the higher the number of transposed tracks, the higher the processing latency.

Returning to FIG. 4, in some embodiments, vocal tracks 412 are only annotated (by annotation module 334), only duplicated and transposed (by transposition module 336), are neither annotated nor duplicated/transposed, or are both annotated and duplicated/transposed. In some embodiments, vocal tracks 412 are first annotated, and then the annotated tracks are duplicated transposed, with each transposed track maintaining the annotations. Alternatively, vocal tracks 412 are first duplicated and transposed, and then the transposed tracks are annotated.

An example matching process will now be described with reference to the operations above the dotted line in FIG. 4.

The processing system 130 receives one or more recorded audio clips (voice 402) from the query input module 236 (FIG. 2) of the performance system 110. In some embodiments, a singer activates the recording of an audio clip (e.g., with a voice or tactile command via the user interface module 224 at the performance system 110) and sings, without instrumental accompaniment, the melody of a desired song for a karaoke performance. The query input module 236 transmits at least a portion of the audio recording to the processing system 130, and the audio segmentation module 340 further processes the audio recording portion(s).

In some embodiments, the query input module 236 or the audio segmentation module 340 extracts a vocal component of the recorded audio clip. For example, if the audio clip serving as the basis for a song query is recorded in a loud environment such as a bar or house party, there may be various components of the audio clip which do not represent the melody being sung by the user (e.g., crowd noise or other background noise). As such, a vocal extraction technique may be used to separate the vocal components representing the melody (e.g., pitch components) from the non-vocal components representing noise. In some embodiments, one or more of the techniques described in U.S. patent application Ser. No. 16/596,554, which is incorporated by reference in its entirety, are used for the vocal extraction process.

The audio segmentation module 340 receives the recorded audio clip and generates audio segments for the matching module 350. The length of each audio segment is chosen to balance latency and accuracy. Longer segments may provide more accurate matching results but may require longer processing times. Shorter segments may also result in increased latency as shorter segment lengths result in an increased number of segments for matching. In some embodiments, each segment is 2.5 seconds long. Other values may be chosen, such as segment lengths less than 2.5 seconds (e.g., 2.0 seconds, 1.5 seconds, 1.0 seconds, or any value less than 2.5 seconds), or segment lengths greater than 2.5 seconds (e.g., 3.0 seconds, 3.5 seconds, 4.0 seconds, or any value greater than 2.5 seconds). This disclosure uses 2.5 second segment lengths for illustrative purposes only; the value is not meant to be limiting. In some embodiments, the audio segmentation module combines the last X segments, where X is an integer greater than or equal to 1, and provides the combined segments to the matching module 350.

As an illustrative example, the audio segmentation module 340 creates an audio segment every 2.5 seconds, and combines the last 4 segments into a single combined 10 second segment. The audio segmentation module 340 sends the combined 10 second segment to the matching module 350 for a matching process (described in more detail below). Every 2.5 seconds, the audio segmentation module 340 adds another 2.5 second segment to the combined 10 second segment and removes the oldest 2.5 second segment, ensuring the combined segment remains 10 seconds long. Again, the segment lengths and quantity of segments in a combined segment used herein are selected for illustrative purposes only, and they are not meant to be limiting.

By creating the 10 second segments out of smaller 2.5 second segments, the matching process may begin before 10 seconds of audio are received. For example, the first execution of the matching process may use the first 2.5 second segment, the next execution of the matching process may use a 5 second combined segment consisting of the first 2.5 second segment and a subsequent 2.5 second segment, and so forth. The use of smaller sampling periods for the creation of segments and combined segments allows for decreased processing latency, since if a match is found in an initial matching process, the processing system 130 would not require a full 10 seconds of audio to be recorded during a song query.

The matching module 350 receives audio segments from the audio segmentation module 340 and compares the audio segments to reference tracks in the reference track library 364 to determine which reference track corresponds to a desired song represented by the audio segments. Stated another way, the matching module 350 matches the user's singing of a melody with the song associated with that melody. Continuing with the example above, every 2.5 seconds, the matching module 350 performs a matching process by comparing (i) the latest audio segment (or combined audio segment) received from the audio segment module 340 and (ii) reference tracks in the reference track library 364. If a threshold number of subsequent matching processes (e.g., 1, 2, or more) result in the same match, the matching module 350 determines that the desired song corresponds to the matching reference track. As a result of this determination, the matching module 350 returns the corresponding backing track 404 from the backing track library 366 (the instrumental track 414 that corresponds with the reference track 412*a*) to the performance system 130 for use during the karaoke performance. For example, if the matching module 350 matches the same song twice in a row, the processing system 130 sends the backing track for that song to the performance system 110 for use during the karaoke performance.

In order to decrease processing latency involved with the matching process, the pool restriction module 352 narrows down the reference track library 364, limiting the number of reference tracks that can be accessed during a particular matching process. In some embodiments, the pool restriction module 352 may limit the reference tracks to those corresponding with songs in a user's personal library (264, FIG. 2) or songs in a user's karaoke playlist (266, FIG. 2). In some embodiments, the pool restriction module 352 may limit the reference tracks to those corresponding to the most popular songs currently available in the song catalog 362, or songs satisfying other filtering criteria (e.g., genre, artist, time period, and so forth).

The actual matching process is carried out by the alignment module 354. The alignment module 354 compares audio segments (recordings of a user singing a melody) to portions of reference tracks 412*a* stored in the reference track library 364 and available for matching, as described above with reference to the pool restricting module 352. In some embodiments, the comparison process is an alignment process which includes determining an amount of similarity a particular audio segment exhibits with portions of each reference track. In some embodiments, the alignment process uses dynamic time warping (DTW) to measure similarity in pitch between (i) portions of the recorded melody in the audio segments and (ii) portions of the reference tracks available for matching.

Additionally or alternatively, the alignment process may use other techniques for comparing pitch contours. For example, the alignment process may be based on a metric embedding space of melodies trained for the task. Use of melodic contours provides a way to compare melodies without having to pass through an alignment procedure. In this case, the comparison process includes encoding a segment of audio (or pitch contour) (e.g., a 10 second segment) into an embedding vector, using an encoder trained for the task. Then, in some embodiments, the comparison among melodic segments is performed using a Euclidean distance between their respective embedding vectors. Moreover, the embedding vectors for the catalogue could be pre-stored allowing for fast retrieval.

In some embodiments, the alignment module 354 compares recorded audio segments to the annotated portions of the reference tracks (e.g., portions beginning at annotations A and B in FIG. 5). In some embodiments, the alignment module 354 compares recorded audio segments to each transposed duplicate of each reference track as described above with reference to FIG. 6. For example, as shown in FIG. 6, a recorded audio segment 610 is aligned with each transposed reference track 620 for a particular song, and a match 625 is found in the track that is in the key of C. This match not only indicates the matching song, but also indicates the key (C) in which the user is singing. That way, when the processing system 130 transmits the backing track to the performance system 110, the processing system 130 can also efficiently transmit the key in which the user is singing to the performance system 110, which then transposes the backing track (using pitch shift module 246, FIG. 2) to match the key in which the user is singing. Alternatively, the processing system 130 transposes the backing track to match the key in which the user is singing, and sends the transposed backing track to the performance system 110 which plays the transposed backing track during the karaoke performance.

For purposes of transposing the backing track, the target key of the backing track corresponds to the version of the reference track (620, FIG. 6) which matched the best out of all the transposed versions. The pitch shift module 246 (FIG. 2) or the matching module 350 determines a pitch shift value based on the target key of the backing track. The pitch shift value is the difference between the matched key (e.g., the key of C in FIG. 6) and the original key of the song. For example, if the song is in the key of A and the matched version is the version transposed to the key of C, than the pitch shift value is a minor third (three semitones, or three twelfths of an octave). Transposing the backing track up by a minor third results in a transposed backing track in the key of C, which matches the key in which the user is singing. In some embodiments, the range of possible transpositions spans between −6 semitones and +6 semitones, which covers an octave.

In some embodiments, the alignment module 354 uses a pre-trained model for performing the matching process, such as any of the models described in U.S. patent application Ser. No. 16/596,554, which is incorporated by reference in its entirety. This model isolates various frequencies of the recorded audio segments and uses one or more neural networks to match the frequencies to corresponding frequencies in the reference tracks.

The matching module 350 analyzes the results of each matching operation (e.g., DTW process) performed by the alignment module 354, and determines which portion of which reference track is associated with the highest similarity value as a result of the analysis. For example, reference portion 625 (FIG. 6) is found to have the highest similarity value to the recorded audio segment 610. In some embodiments, the matching module 350 performs at least one more matching operation, and if the same reference portion (e.g., 625) is found to have the highest similarity value again, then that reference portion is determined to be a match to the audio segment. Stated another way, when the same reference track has been matched twice in a row (or more depending on the threshold), that song associated with that reference track is determined to be the song which the user is singing.

The timing module 356 determines the playback position of the backing track for the karaoke performance, so that the user does not have to start the song over when a match has been made. More specifically, the timing module 356 determines at which point in the song the performance system 110 should begin playing the matched backing track for the karaoke performance so that the backing track plays along with the portion of the song that the user is currently singing. For example, the user sings, without accompaniment, a melody of a desired song. The query input module 236 records the user singing, and the processing system 130 matches the recording with the user's desired song. As the user continues to sing, the performance system 110 begins playing the backing track at a moment in the song proximate to the user is singing, so that the user does not have to stop singing between a first time window defined by the amount of time it takes for the processing system 130 to determine a match, and a second time window beginning the moment the match is made and continuing through the end of the song while the performance system 110 accompanies the singer by playing the matched backing track. Throughout each process (query and performance), the user may continue to sing while the backing track is seamlessly inserted into the performance. The timing module 356 is optional and may be controlled by performance settings 262 or by user commands via the user interface 224.

In some embodiments, the timing module 356 determines the playback position of the backing track (the point at which to begin playing the backing track) based on the location of the corresponding reference track at which recording or sampling ends (at the audio segmentation module 340). This is the point at which a match has been found, and it proximate to the user's current position in the song because it immediately follows the user's last portion of the a cappella performance.

In some implementations, the timing module 356 determines the playback position of the backing track to be the beginning of the next verse or chorus (in relation to the user's current position in the song). The timing module 356 may use the annotations inserted by the annotation module 334 to determine when the next verse or chorus begins. Configuring the backing track to begin playback at only the beginning of a verse or chorus, rather than at any point in the song (which would require tagging every second of the song) further contributes to decreased processing latency.

In some embodiments, the matching process (e.g., DTW) of the alignment module outputs tempo data in addition to song and/or key results. For instance, the matching process may determine that the user is singing at a particular tempo or speed. The timing module 356 may use this tempo data to project a more accurate playback position for the backing track, and to signal to the performance system 110 the tempo at which to play the backing track. If the tempo is different from the original tempo of the backing track, the tempo shift module 248 (FIG. 2) may shift the tempo of the backing track to match the tempo at which the user is singing based on the tempo data determined during the matching process. In some embodiments, the tempo shift module 248 or the matching module 350 determines the amount of tempo shifting required to match the user's singing tempo by averaging the slope of the DTW alignment, or by computing the advancement in song position between two consecutive audio segments (e.g., 2.5 seconds apart) that have been matched, or a combination of these two methods.

In some embodiments, the timing module 356 accounts for network delays and the various processing delays described above in projecting playback positions for backing tracks.

In some embodiments, the audio playback module 244 (FIG. 2) fades in the backing track at the specified playback position. That way, if the playback position is not entirely accurate, the user has advance notice to adapt his or her singing to the playback position of the backing track.

In some embodiments, the matching module 350 performs a word recognition process on the audio segments received from the audio segmentation module 340 in order to determine the words that the user is singing. The alignment module 354 may take the words into account during the matching process by matching the words to lyrics associated with the reference tracks.

In some embodiments, when the audio playback module 244 of the performance system 110 begins playing the backing track, the query input module 236 is configured to stop recording, so that the backing track does not become a part of the recorded audio segments and erroneously cause subsequent matches to be made.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for the purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
at a first electronic device, the first electronic device having one or more processors and memory storing instructions for execution by the one or more processors:
pre-configuring a song library by storing groups of related tracks, each group of related tracks corresponding to a respective song and having tracks of the respective song that differ in key;
receiving an audio clip;
performing a matching process on the audio clip, wherein the matching process includes:
comparing at least a portion of the audio clip to the stored groups of related tracks in the song library; and
identifying, based on the comparing, a first group that includes a first portion of a particular reference track that corresponds to the portion of the audio clip;
providing a backing track for playback, wherein the backing track corresponds to the particular reference track; and
providing an initial playback position of the backing track, wherein the initial playback position corresponds to a second portion, subsequent to the first portion, of the particular reference track.

2. The method of claim 1, wherein each track in each respective group of related tracks is associated with a pitch, and the backing track corresponds to the pitch of a related track that matches a pitch corresponding to the audio clip.

3. The method of claim 1, wherein each respective group of related tracks includes tracks corresponding to version of the same audio content transposed to different keys.

4. The method of claim 1, wherein each track in each respective group of related tracks is associated with a tempo, and the backing track corresponds to the tempo of a related track that matches a tempo corresponding to the audio clip.

5. The method of claim 1, further comprising:
prior to receiving the audio clip:
producing each group of related tracks by duplicating a respective track and transposing each duplicated track to a different key.

6. The method of claim 1, further comprising:
prior to receiving the audio clip:
annotating the tracks of the respective song by tagging at least one verse and at least one chorus for each track in the stored groups of related tracks;
wherein comparing the portion of the audio clip to the stored groups of related tracks comprises comparing the portion of the audio clip to one tagged verse and one tagged chorus of each of the tracks in the stored groups of related tracks.

7. The method of claim 6, wherein the initial playback position of the backing track corresponds with a tag proximate to the first portion of the particular reference track.

8. The method of claim 6, wherein each of the tracks in the group of related tracks includes a subset, less than all, of an audio content item to which the particular reference track corresponds.

9. The method of claim 1, further comprising limiting the stored groups of related tracks in the song library to a subset, less than all, of the tracks stored by a media content provider.

10. The method of claim 9, wherein the subset of tracks corresponds to a playlist generated by the media content provider or by a user, or by a ranked set of reference tracks corresponding to a popularity value based on streaming activity.

11. The method of claim 1, further comprising:
subsequent to receiving the audio clip:
receiving a second audio clip;
combining the second audio clip with the previously received audio clip to form a combined audio clip; and
performing the matching process on the combined audio clip.

12. The method of claim 1, further comprising:
identifying, within the audio clip, a plurality of words;
wherein the matching process further includes comparing the plurality of words to lyrics associated with the tracks in the song library.

13. An electronic device having one or more processors and memory storing one or more programs to be executed by the one or more processors, the one or more programs including instructions for:
pre-configuring a song library by storing groups of related tracks, each group of related tracks corresponding to a respective song and having tracks of the respective song that differ in key;
receiving an audio clip;
performing a matching process on the audio clip, wherein the matching process includes:
comparing at least a portion of the audio clip to the stored groups of related tracks in the song library; and
identifying, based on the comparing, a first group that includes a first portion of a particular reference track that corresponds to the portion of the audio clip;
providing a backing track for playback, wherein the backing track corresponds to the particular reference track; and
providing an initial playback position of the backing track, wherein the initial playback position corresponds to a second portion, subsequent to the first portion, of the particular reference track.

14. The electronic device of claim 13, wherein each track in each respective group of related tracks is associated with a pitch, and the backing track corresponds to the pitch of a related track that matches a pitch corresponding to the audio clip.

15. The electronic device of claim 13, wherein each respective group of related tracks includes tracks corresponding to version of the same audio content transposed to different keys.

16. The electronic device of claim 13, wherein each track in each respective group of related tracks is associated with a tempo, and the backing track corresponds to the tempo of a related track that matches a tempo corresponding to the audio clip.

17. A non-transitory computer readable storage medium storing one or more programs configured for execution by a computer system, the one or more programs including instructions for:
pre-configuring a song library by storing groups of related tracks, each group of related tracks corresponding to a respective song and having tracks of the respective song that differ in key;
receiving an audio clip;
performing a matching process on the audio clip, wherein the matching process includes:
comparing at least a portion of the audio clip to the stored groups of related tracks in the song library; and identifying, based on the comparing, a first group that includes a first portion of a particular reference track that corresponds to the portion of the audio clip;

providing a backing track for playback, wherein the backing track corresponds to the particular reference track; and providing an initial playback position of the backing track, wherein the initial playback position corresponds to a second portion, subsequent to the first portion, of the particular reference track.

18. The non-transitory computer readable storage medium of claim 17, further comprising instructions for:
prior to receiving the audio clip:
producing each group of related tracks by duplicating a respective track and transposing each duplicated track to a different key.

19. The non-transitory computer readable storage medium of claim 17, further comprising instructions for:
prior to receiving the audio clip:
annotating the tracks of the respective song by tagging at least one verse and at least one chorus for each track in the stored groups of related tracks;
wherein comparing the portion of the audio clip to the stored groups of related tracks comprises comparing the portion of the audio clip to one tagged verse and one tagged chorus of each of the tracks in the stored groups of related tracks.

20. The non-transitory computer readable storage medium of claim 19, wherein the initial playback position of the backing track corresponds with a tag proximate to the first portion of a related track.

* * * * *

UNITED STATES PATENT AND TRADEMARK OFFICE
CERTIFICATE OF CORRECTION

PATENT NO. : 11,366,851 B2
APPLICATION NO. : 16/719779
DATED : June 21, 2022
INVENTOR(S) : Marchini et al.

It is certified that error appears in the above-identified patent and that said Letters Patent is hereby corrected as shown below:

In the Claims

Claim 3, Column 15, Line 32, please delete "corresponding to version" and insert --corresponding to a version--;

Claim 15, Column 16, Lines 44-45, please delete "corresponding to version" and insert --corresponding to a version--.

Signed and Sealed this
Sixth Day of September, 2022

Katherine Kelly Vidal
*Director of the United States Patent and Trademark Office*